June 5, 1962  J. CUMMINS  3,037,499
VEHICLE SEAT VIBRATOR ASSEMBLY
Filed Nov. 17, 1959
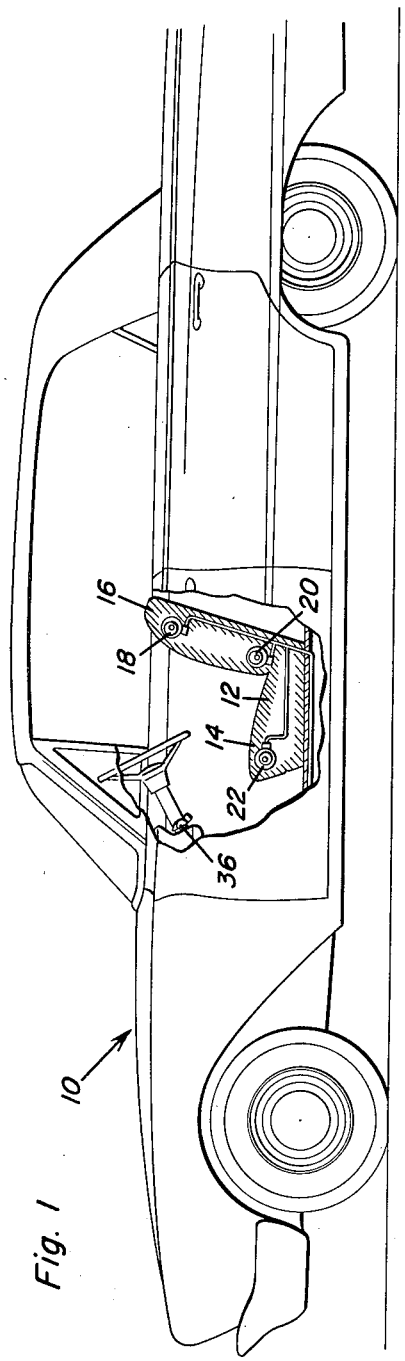
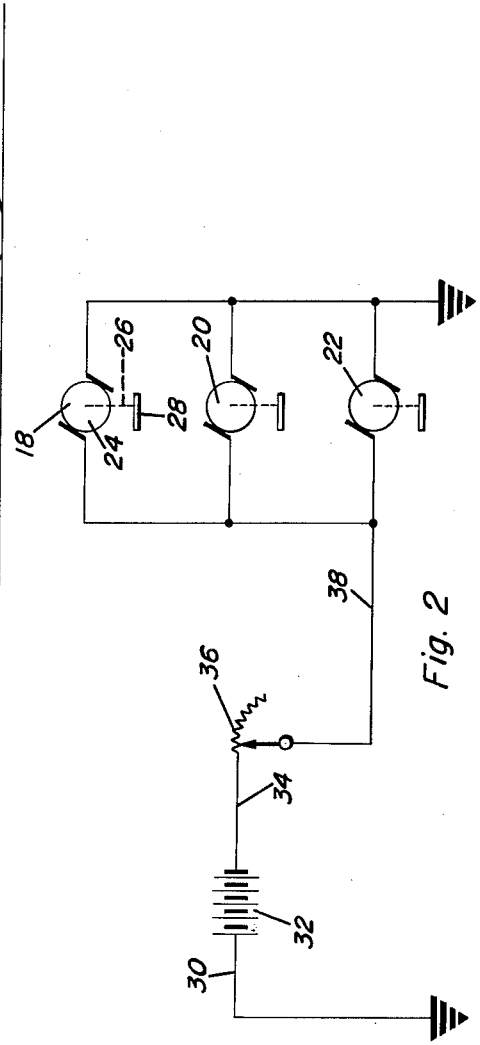
John Cummins
INVENTOR.
BY *Clarence A. O'Brien*
and *Harvey B. Jacobson*
Attorneys United States Patent Office 3,037,499
Patented June 5, 1962

3,037,499
VEHICLE SEAT VIBRATOR ASSEMBLY
John Cummins, 120 Solomon Ave., Inwood, N.Y.
Filed Nov. 17, 1959, Ser. No. 853,568
5 Claims. (Cl. 128—33)

This invention relates to attachments for motor vehicles and more particularly to an assembly for immediately arousing a motorist at such time that the motorist becomes drowsy for any reason.

An object of the invention is to provide an assembly for a motor vehicle which functions as a safety device in that the motorist is capable of arousing himself the moment that the motorist realizes that he is becoming drowsy, for example from fatigue, so called highway hypnosis or from other causes.

Briefly, the invention is embodied in one or more vibrators which are connected with or at least, concealed within the seat of the motor vehicle. The vibrators are in an electrical circuit under the control of the motorist. At such time the motorist feels that he is not as alert as he should be, a simple circuit closing operation, e.g. closing an instrument panel mounted switch, enables the motorist to receive mechanical vibrations from the vibrator or vibrators.

Although one vibrator is probably all that is necessary in most instances, the invention contemplates any number of vibrators positioned within the seat so that the vibratory movement may be imparted to the body of the vehicle operator at several spaced places.

One typical organization has a single vibrator mounted at the upper part of the backrest, another at the juncture of the seat portion and backrest of the motor vehicle seat, and another vibrator at the front edge of the seat portion. Each of the vibrators is rendered operative simultaneously so that there is a dramatic simultaneous mechanical vibration imparted to the motorist at the three parts of the anatomy which would ordinarily occupy the above-mentioned portions of the motor vehicle seat.

Although the principal feature of the invention is in a safety device to immediately dispel drowsiness in a motor vehicle operator, it is also within the contemplation of the invention to use similar vibrators for relaxation. Such vibrators though for safety reasons are to be confined to the portion of the front seat which is not occupied by the vehicle operator and to the rear seat of the motor vehicle.

Functionally, the vibrator assembly to dispel drowsiness functions on a sudden mechanical shock principle. The motorist is rather crisply shaken by application of mechanical vibratory forces at several places of his anatomy. The suddenness of the operation functions to arouse the motorist, and the vibrators used for this purpose are not to be confused with those currently advertised to induce relaxation, improve blood circulation and other therapeutic claims.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a motor vehicle, parts broken away in section to illustrate the interior of a vehicle seat at the motor vehicle operator's station, showing a preferred arrangement of vibrators in the seat.

FIGURE 2 is a wiring diagram showing the electric circuit including the three illustrative vibrators.

In the accompanying drawings motor vehicle 10 is illustrated to show the environment of the invention. Although an automobile is shown, it is clearly understood that other types of vehicles may well use the principles of the invention, so long as there is a vehicle seat 12 therein. The illustrated seat has a seat portion 14 and a backrest 16. Structurally, the seat is absolutely conventional. However, it is equipped with three mechanical vibrators 18, 20 and 22 embedded within the covering of the seat and suitably supported so as to occupy the positions shown in FIGURE 1. The suitable support may be obtained by the use of ordinary mounting brackets securing the vibrators 18, 20 and 22 to the framework of the seat.

Each vibrator is similar in construction. For example, the typical vibrator 18 (FIGURE 2) is made of an electric motor 24 having a shaft 26 extending therefrom to which an eccentric weight 28 is fixed. When the motor is rendered operative, the eccentric weight 28 rotates causing mechanical vibrations to be generated and transmitted to the seat through the framework thereof and to the seat occupant. The cloth or plastic covering of the seat is closely adjacent to the vibrators, and the mechanical vibrations are transmitted through the seat covering to the anatomy of the motorist.

Electric circuit 30 includes the three vibrators 18, 20 and 22, each of which is connected in parallel. Consequently, each vibrator is rendered operative simultaneously. A source of electrical potential, diagrammatically illustrated as battery 32 of the motor vehicle, is connected to ground and also connected by way of conductor 34 to a rheostat 36 of the switching type. Electric conductor 38 extends from the rheostat to the group of vibrators, each of which is connected in parallel as mentioned previously. The motors of the vibrators are connected to ground to complete the circuit.

It is preferred that rheostat switch 36 be mounted at some place within the motor vehicle within easy or handy reach of the motorist. One suggestion is to have the switch mounted on the instrument panel as shown in FIGURE 1. Further, the vibrators are preferably mounted near the upper part of the backrest 16, at the juncture of the backrest and the seat portion 14, and at the front edge of the seat portion 14, respectively. This is to provide as full coverage as possible of the anatomy of the motor vehicle operator.

As mentioned, previously, additional vibrators may be included in the seats in the motor vehicle but for other purposes. Such vibrators are independently controlled in accordance with the desires of the passengers. They may be mounted at any place within the seat, for instance those shown in FIGURE 1. The difference in operation, though, between those vibrators mounted for comfort and therapeutic purposes and those (FIGURE 1) mounted for jolting the motor vehicle operator into a more conscious state, is in the application of the forces. The dash mounted rheostat is arranged so that maximum power is applied to the motors of the vibrators as soon as the rheostat switch is closed so that there is suddenness in the application of the mechanical forces, and this literally jolts the motor vehicle operator into a more conscious condition, immediately dispelling drowsiness.

Without attempting to be repetitious it is reiterated, for emphasis, it is one of the objects of the invention to provide simple and practical means which functions in a reliable manner to keep the driver alert and to thus condition his reflexes for use if and when necessary. The unique high torque action, involving a plurality of electromechanical vibrators, located at significant and strategic areas in relation to the seat, make it impossible for the driver to fall asleep at the wheel when driving. The combined action generated by the several motors stimulates blood circulation in the body of the driver consequently dissipating any onset of drowsiness. Considering the fact that automobile operators and drivers, particularly truck drivers on long hauls, have to resort to the use of Benzedrine and other powerful stimulants to stay awake, and having observed the behavior of drivers under the influence of drugs, little argument is required to recognize the problem at hand and the practical solution thereof as herein revealed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in keeping awake a vehicle operator while driving, a seat, a safety device comprising at least one vibrator operatively mounted within the confines of and secured to that part of the seat occupied by the operator, and electric circuit structure connectible with a source of electrical potential and including a conductor connected with said vibrator to conduct electrical energy to the vibrator, and manually regulatable current control means interposed in said conductor between said vibrator and the source of electrical potential, said circuit controlling means embodying a manually operable switching rheostat, said vibrator when operating inflicting jolts on the occupant of said seat of such severity as to keep him awake.

2. A device as defined in claim 1 wherein said vibrator comprises a weight eccentrically mounted on the rotatable drive shaft of an electric motor.

3. A body invigorating and blood circulation stimulator for a motor vehicle operator's seat comprising, in combination, a seat portion and a cooperable backrest, a plurality of electrically operable mechanical vibrators operatively mounted in said backrest and said seat portion repsectively, each of said vibrators comprising a rotary type electric motor with a weight eccentrically mounted on its drive shaft, an electric circuit structure adapted to connect with the source of electrical potential, said circuit structure including a circuit conductor extending from a source of electrical potential, said vibrators connected in parallel and operatively connected with said conductor, and manually actuatable current regulating means embodied in said conductor between said vibrators and the source of electrical potential, said vibrators when operating inflicting jolts on the occupant of said seat of such severity as to keep him awake.

4. A safe driving promotion device for a motor vehicle comprising an operator's seat having a seat portion and a backrest, a plurality of electrically operative vibrators mounted in said backrest and said seat portion respectively, an electric circuit structure adapted to connect with a source of electrical potential including a circuit conductor extending from the source of electrical potential, said vibrators connected in aparallel and operatively connected with said conductor, a current regulating rheostat interposed in said conductor between said vibrators and the source of electrical potential, one of said vibrators mounted in said backrest adjacent to the upper edge of the backrest, another of said vibrators mounted in the seat at the juncture of the seat portion and backrest, and a third vibrator mounted in the seat portion adjacent the forward upper edge thereof.

5. For use in stimulating and keeping awake an operator while driving a motor vehicle, an improved seat comprising a vertical backrest and a horizontal seat portion cooperating with the backrest and in a plane at right angles thereto, a first electro-mechanical vibrator operatively embedded in the upper portion of the backrest adjacent to that surface intended to support the upper part of the user's back, a second electro-mechanical vibrator embedded in the lower part of the backrest adjacent the rearward edge portion of the seat portion, a third electro-mechanical vibrator embedded in the forward portion of the seat portion, all of said vibrators being approximately aligned and simultaneously operable and included in an electric circuit, said circuit also including a rheostat operatively connected to said vibrators and adapted to be mounted on a relatively stationary part of the vehicle within convenient reach of the aforementioned operator to enable the circuit to be energized and deenergized in keeping with the requirements of the operator, each of said vibrators embodying an electric motor having a shaft extending therefrom carrying an eccentric weight whereby when the motor is operating the eccentric weight rotates causing mechanical vibrations to be generated and transmitted to adjacent portions of the backrest or seat, as the case may be, and results in subjecting the occupant to jolts of such severity as to keep him awake.

References Cited in the file of this patent

UNITED STATES PATENTS

| 2,808,827 | O'Hara | Oct. 8, 1957 |
| 2,922,416 | Fader | Jan. 26, 1960 |

FOREIGN PATENTS

| 447,222 | Great Britain | May 14, 1936 |